(12) United States Patent
Waller et al.

(10) Patent No.: US 7,577,612 B2
(45) Date of Patent: Aug. 18, 2009

(54) SELF SERVICE TERMINAL

(75) Inventors: Michael Waller, London (GB); Pierpaolo DeGobbi, London (GB); John G. Savage, Fife (GB); Roderick J. M. MacLeod, London (GB)

(73) Assignee: NCR Corporation, Dayton, OH (US)

( * ) Notice: Subject to any disclaimer, the term of this patent is extended or adjusted under 35 U.S.C. 154(b) by 2012 days.

(21) Appl. No.: 09/780,696

(22) Filed: Feb. 9, 2001

(65) Prior Publication Data
US 2001/0051922 A1 Dec. 13, 2001

(30) Foreign Application Priority Data

Feb. 18, 2000 (GB) ................ 0003800.0
Mar. 13, 2000 (GB) ................ 0006030.1

(51) Int. Cl.
*G06Q 40/00* (2006.01)
(52) U.S. Cl. ............... 705/43; 705/40; 705/44; 235/379
(58) Field of Classification Search ........... 705/40, 705/43, 44; 235/379
See application file for complete search history.

(56) References Cited

U.S. PATENT DOCUMENTS 5,915,023 A 6/1999 Bernstein
6,016,476 A 1/2000 Maes et al.
6,584,309 B1* 6/2003 Whigham ............... 455/414.1
6,648,220 B1* 11/2003 Junkins et al. ............ 235/379

FOREIGN PATENT DOCUMENTS

EP 0 933 733 A2 4/1999
EP 1 136 962 A2 9/2001
WO WO 98/11519 3/1998

OTHER PUBLICATIONS

South China Morning Post, Make Over Opens Up World Of Potential, Mar. 2001.*
Patent Abstracts of Japan, vol. 1998, No. 11, Sep. 30, 1998 & JP 10 149400 A (Hitachi Ltd; Hitachi Asahi Electron:KK), Jun. 2, 1998.

* cited by examiner

*Primary Examiner*—Richard C Weisberger
(74) *Attorney, Agent, or Firm*—Gregory A. Welte

(57) ABSTRACT

A self-service terminal (14 or 114 or 214) and a system (10, 100, 200) including a plurality of networked self-service terminals are described. Each terminal (14, 114, 214) has a simple user interface. In one type of terminal (114 or 214), the user interface consists of a dispense area. In another type of terminal (14), the user interface consists of a dispense area (40) and a communication port (38). In one of the systems (10) a user is able to execute a transaction using a portable communication device (24 or 26) implementing a local wireless technology. In the other systems (100 or 200) a user is able to execute a transaction using a cellular network.

3 Claims, 4 Drawing Sheets

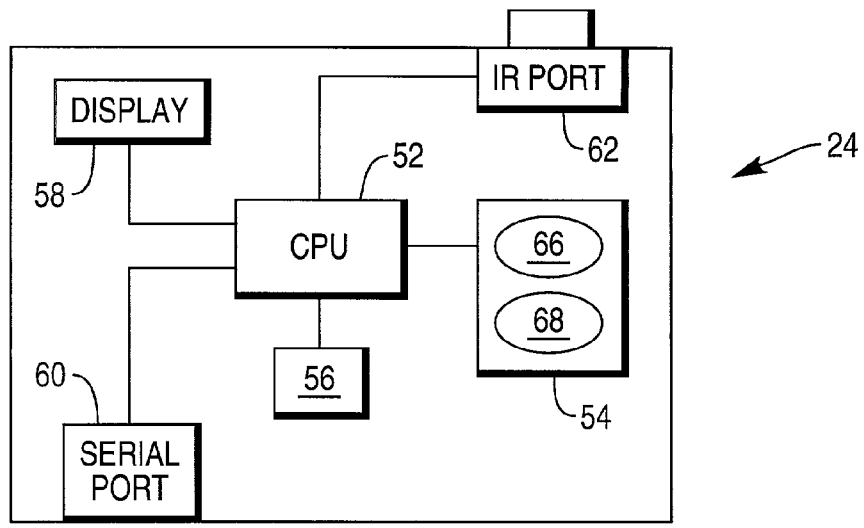
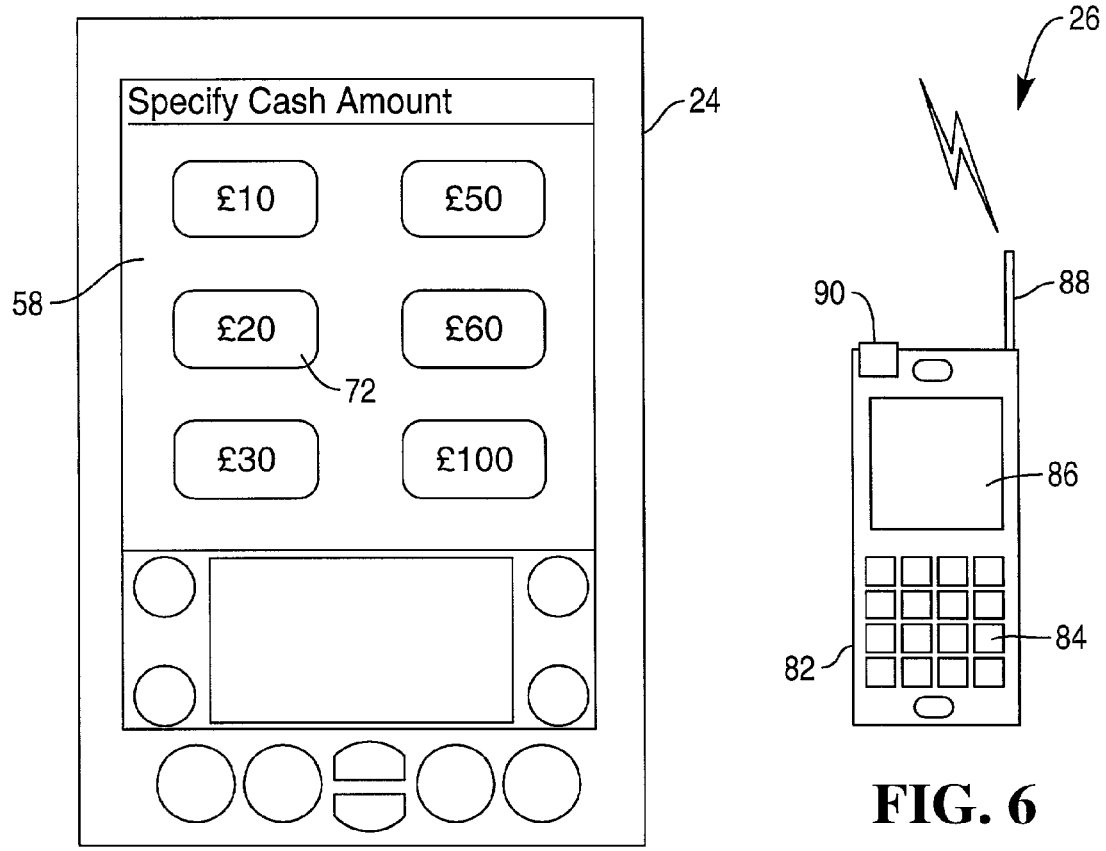

SELF SERVICE TERMINAL

BACKGROUND OF THE INVENTION

The present invention relates to a self-service terminal (SST), an SST system, and to a method of operating an SST. In particular, the invention relates to SSTs in the form of automated teller machines (ATMs), and especially low cost ATMs.

ATMs are widely used for dispensing cash and other valuable media. Conventional ATMs provide a user interface that includes a plurality of user interface elements, such as a display and an encrypting keypad, located within a molded fascia.

The display is used to present the user with screens that assist the user in navigating through a transaction. The screens are also used to reassure the user by providing visual feedback about the status of the transaction. To further assist users, a conventional display includes function display keys (FDKs) located on opposite sides of the display. The FDKs align with selectable options that are presented on a screen, so that a user can select an option using an FDK that aligns with a graphical representation of that option. Conventional ATM displays may be monochrome or full color displays.

The keypad is used to allow a user to enter data requested by the ATM, such as the user's personal identification number (PIN). The keypad encrypts the user's PIN to ensure that the user's PIN can be securely transmitted within the ATM.

The ATM user interface may also include an audio facility for providing the user with audio information, such as audible transaction information or advertisements.

As these user interface elements are expensive, the cost of ATMs including these elements is relatively high. This reduces the number of ATMs that a financial institution is willing to deploy.

SUMMARY OF THE INVENTION

It is an object of one or more embodiments of the present invention to obviate or mitigate the above disadvantage or other disadvantages associated with conventional SSTs.

According to a first aspect of the present invention there is provided a self-service terminal having a user interface characterized in that the user interface consists essentially of a communication port and a dispense area.

By virtue of this aspect of the invention an SST is provided that does not require a display or a keypad. The SST is intended to be used by a user having a portable communication device such as a personal digital assistant (PDA) or a cellular telephone. By using the PDA or cellular telephone, the user is providing his/her own user interface. The PDA may be a Psion (trade mark) Series 5 PDA, a 3-Com (trade mark) Palm IIIx (trade mark) PDA, or such like. The cellular telephone may be a conventional cellular telephone.

In one embodiment, the user interface consists of a communication port and a dispense area.

The communication port may be accessible using a local wireless technology, such as Bluetooth (trade mark), an IrDA-compliant (Infra-red Data Association) protocol, or such like. This has the advantage that the user must be located in the vicinity of the communication port (and therefore in the vicinity of the terminal) to operate the terminal. Alternatively, the communication port may be accessible using wireless telephony.

The dispense area may be a dispense slot, a spray dispense area or such like.

The dispense area may be suitable for dispensing any convenient type of media, such as banknotes, stamps, telephone cards, ski passes, or such like.

Preferably, the communication port is operable to transmit transaction information to the user's portable communication device so that the user is provided with feedback about the transaction, such as status information. The information may be in audio form or in text form.

According to a second aspect of the present invention there is provided a self-service terminal having a dispenser and a user interface, characterized in that the user interface consists essentially of a dispense area.

Preferably, the terminal includes a network connection for communicating with a central controller located remotely from the terminal, whereby, a user is able to conduct a transaction by accessing the central controller, and the central controller is operable to activate the dispenser via the network connection. The network connection may use cables or it may be a wireless connection.

By virtue of this aspect of the invention, a user is able to access a central controller using a portable communication device. The user is able to prepare a transaction using the communication device and to receive the dispensed media from the terminal. This has the advantage that the terminal only has to interact with a central controller, not with a user's communication device.

According to a third aspect of the present invention there is provided a self-service terminal network comprising a central controller and a plurality of self-service terminals, where each terminal includes a wireless communication port for receiving a request from a user for dispensing media, and a network connection for transmitting the request to the central controller, where the central controller is operable to authorize the request and to instruct the terminal to dispense valuable media to implement the request.

Preferably, each terminal includes an encryption/decryption facility for receiving and transmitting encrypted messages.

Each terminal may have a unique identifier so that a user can enter this unique identifier to confirm that the user is at the terminal that is to dispense valuable media.

According to a fourth aspect of the present invention there is provided a method of operating a cash dispensing mechanism comprising the steps of: receiving a transmission from a portable wireless telephone, where the transmission requests an amount of cash to be dispensed; obtaining authorization for dispensing the amount of cash, dispensing the amount of cash; and charging a service fee for dispensing the cash to an account relating to the telephone.

Preferably, the step of receiving a transmission includes receiving an authentication code.

Preferably, the authentication code is encrypted by the telephone prior to being communicated.

Preferably, the authentication code is derived through a biometrics identification of the user of the telephone. This may be implemented using a fingerprint sensor or other suitable biometrics sensor.

According to a fifth aspect of the present invention there is provided a method of operating a cash dispensing mechanism comprising: dialing a telephone number associated with the cash dispenser using a wireless telephone; receiving an inquiry via the telephone connection as to the amount of cash to be dispensed; confirming the amount using the telephone; dispensing the cash from the mechanism; and charging a service fee for dispensing the cash to the account of the telephone.

According to a sixth aspect of the present invention there is provided a method of operating a cash dispensing network comprising a plurality of cash dispensing mechanisms, comprising the steps of: associating a unique telephone number with each cash dispensing mechanism; creating a customer to dispenser link by answering a call placed to one of the cash dispensing mechanisms by a customer; receiving an enquiry over the customer to dispenser link relating to cash to be dispensed; confirming the amount of cash to be dispensed using the customer to dispenser link; dispensing the cash; and charging a service fee to an account held by the customer.

The method may include the further step of crediting an account held by the customer. The credit may relate to additional call time, such as free call time.

The method may include the further step of advising the customer of a service charge for the cash withdrawal prior to authorizing the transaction.

According to a seventh aspect of the present invention there is provided a telecommunications banking system comprising a plurality of cash dispensing mechanisms, each mechanism having an associated telephone number, a call center for managing the cash dispenser mechanisms, and one or more wireless communicators having an identifier for identifying a valid user of the communicator; whereby, in use, a user dials a telephone number associated with that dispenser using the wireless communicator, and the call center: answers the user's call and creates a customer to dispenser link; receives a valid user identity signal sent by the wireless communicator; receives an enquiry over the customer to dispenser link relating to cash to be dispensed; confirms the amount of cash to be dispensed using the customer to dispenser link; sends an authentication signal to the dispenser for dispensing cash to the user, where the signal includes the amount of cash to be dispensed; deducts the cash from a first account held by the user; and charges a service fee to the customer.

The service fee may be deducted from the first account or a second account.

For each transaction executed by a user, the system may credit an account held by the user with a transaction fee. This fee may be used to offset the cost of ownership of the wireless communicator.

According to an eighth aspect of the present invention there is provided a telecommunications banking system comprising a plurality of cash dispensing mechanisms, each mechanism having an associated transceiver with a unique telephone number, and each mechanism being accessible by a wireless communication device issued to a user; whereby, in use, a user dials a telephone number associated with that dispenser using the wireless communicator, enters a cash withdrawal transaction using the wireless communicator, receives the requested cash from the dispenser, and is charged a transaction fee by the banking system.

Each transceiver may be located within a cash dispensing mechanism, or each transceiver may be located at a central location.

According to a ninth aspect of the present invention there is provided a low cost ATM comprising a mechanism for dispensing cash to a user, wherein data input by a user and data output to the user is conveyed solely via a wireless connection.

Preferably, the wireless connection is a telephony connection.

According to a tenth aspect of the present invention there is provided a low cost ATM comprising a mechanism for dispensing cash to a user, wherein data input to and data output from the ATM is conveyed solely via a wireless connection.

According to an eleventh aspect of the present invention there is provided a low cost ATM comprising: a mechanism for dispensing cash to a user; a card reader; and a telephony connection; wherein data input and output to and from said ATM occurs solely through said card reader and telephony connection.

According to a twelfth aspect of the present invention there is provided a method comprising the steps of: identifying an ATM which has a display for displaying withdraw options and a touch input mechanism for receiving user commands; and modifying the ATM so that it receives user commands from a wireless telephone.

According to a thirteenth aspect of the present invention there is provided a transceiver for installing in an SST, where the transceiver is operable to conduct wireless communication with a user of the SST, and the transceiver is adapted to convey transactions to the SST, so that when the transceiver is installed in an SST a user can execute a transaction on the SST using a wireless communication device.

According to a fourteenth aspect of the present invention there is provided a method of operating a self-service terminal network, the method comprising the steps of: providing a user with a financial program for executing on a portable communication device to provide a programmed device; providing a plurality of terminals operable to interact with such a programmed device; receiving a transaction from such a programmed device; authorizing the received transaction; and fulfilling the authorized transaction.

According to a fifteenth aspect of the present invention there is provided a method of dispensing cash, the method comprising the steps of: providing a telephone number for a user to dial from a wireless handset; identifying the wireless handset; requesting entry of a personal identification number via the handset; dispensing a requested amount of cash; and charging the transaction to an account relating to the handset.

According to a sixteenth aspect of the present invention there is provided a self-service terminal operable to dispense valuable media in response to a request received from a wireless communication device.

The terminal may be operable in two modes, whereby in the first mode a user may enter information using a user interface located on the terminal, and in the second mode a user may enter information using a portable user interface. The portable user interface may be a wireless telephone.

According to a seventeenth aspect of the invention there is provided a method of operating a self-service terminal, the method comprising the steps of: providing a user with a plurality of operating modes; detecting selection of one of the operating modes; and processing a transaction entered using the selected mode.

One operating mode may involve entering data using a user interface located on the terminal. Another operating mode may involve entering data using a wireless communication device.

It will now be appreciated that SSTs and networks of SSTs according to the present invention have a number of advantages. As each user carries his/her own user interface it is easier for each user to personalize his/her user interface. In addition, a user is able to use any interface they desire to communicate with a terminal. This means that a disabled person is able to use a user interface that is adapted for their specific disability, for example a blind person is able to use an audio interface, a deaf person is able to use a visual interface, and such like. As the terminals use few user interface elements, the cost of buying and maintaining each ATM is reduced, thereby making it more cost effective to deploy large numbers of these terminals. As there are fewer user interface elements on the terminals, they are more resistant to attack by vandals. As no graphical display is required, the terminals are able to use inexpensive PC cores; that is, the PC core does not require the high processing power or the large amount of memory associated with high resolution video displays.

BRIEF DESCRIPTION OF THE DRAWINGS

These and other aspects of the invention will be apparent from the following specific description, given by way of example, with reference to the accompanying drawings, in which:

FIG. 3 is a block diagram of one type of portable communication device for use with the system of FIG. 1;

FIG. 4 is a pictorial view of the portable device of FIG. 3 in operation;

FIG. 6 is a pictorial front view of another type of portable communication device for use with the system of FIG. 1;

DETAILED DESCRIPTION

Figure 1:
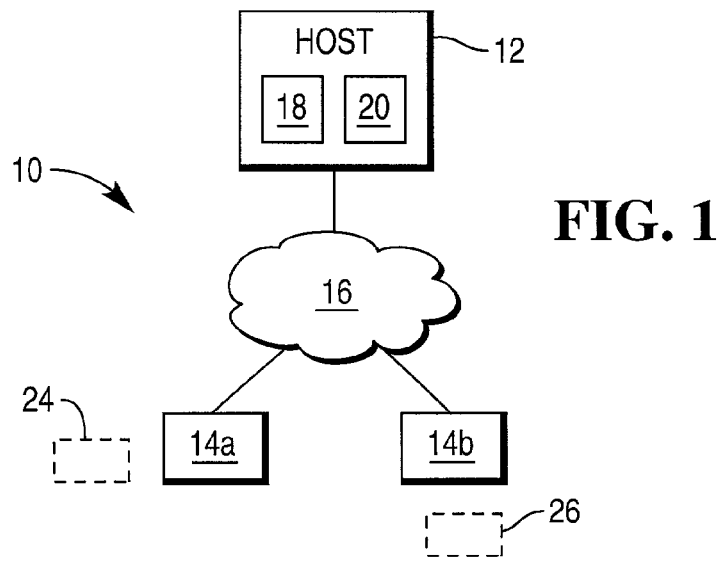
FIG. 1 is a block diagram of a self-service terminal system in accordance with one embodiment of the invention.

Referring now to FIG. 1, which is a block diagram of a self-service terminal system 10 in accordance with one embodiment of the present invention, the system 10 comprises a conventional host 12 interconnected to a plurality of SSTs 14 (only two are shown) by a network 16. The SSTs 14 are ATMs. As is well known in the art, the host 12 includes an authorization facility 18 and a back-office facility 20. The ATMs 14 are physically remote from each other, but are shown in proximity in FIG. 1 for clarity.

FIG. 1 also shows one type of portable communication device 24 (a PDA such as a 3Com PalmIIIx (trade mark)) in communication with one of the terminals 14a, and another type of portable communication device 26 (a GSM cellular telephone such as a NOKIA 7110 (trade mark)) in communication with the other terminal 14b. The portable communication devices 24,26 are shown in broken line in the vicinity of the respective terminals 14.

Figure 2:
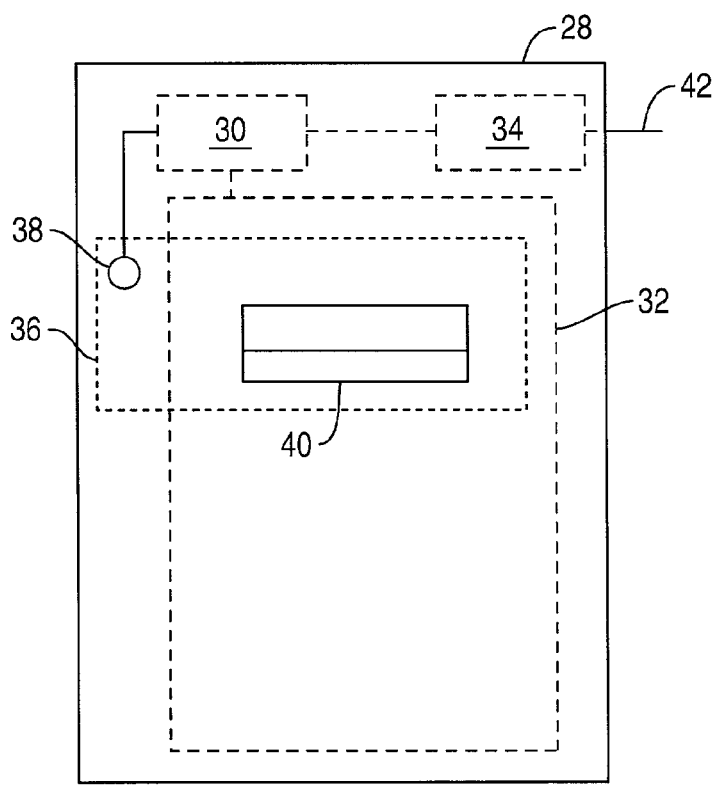
FIG. 2 is a schematic front view of one of the terminals of FIG. 1.

FIG. 2 is a schematic diagram of one of the ATMs 14 of FIG. 1. The ATM 14 has a safe 28 housing a processing module 30 (shown in broken line) coupled to a cash dispenser 32 (shown in broken line) and a conventional network connection 34 (also shown in broken line). The ATM 14 has a simple user interface 36 consisting of a communications port 38 coupled to the processor 30, and a dispense area 40 in the form of a tray for receiving bank notes. The port 38 is an IrDA compliant module for receiving and transmitting information in infra-red format. The network connection 34 is coupled to the network 16 (FIG. 1) by a cable 42.

FIG. 3 illustrates the architecture of PDA 24. PDA 24 comprises a controller 52 and associated volatile memory 54 and non-volatile memory 56, a touch-sensitive display 58, a serial communication port 60 for receiving a connector, and a wireless communication port 62 in the form of an IrDA-compliant infra-red port. The controller 52 is responsible for the operation of the device 24, and is coupled to the display 58, serial port 60, and IR port 62. In use, the controller 52 loads a simple operating system 66 and an ATM transaction program 68 into the volatile memory 54.

The transaction program 68 provides a user of the PDA 24 with a user interface for preparing transactions for executing on the ATM 14 and also provides an encryption/decryption facility for encrypting any transactions to be transmitted or stored.

Referring now to FIG. 4, when the transaction program 68 is selected by a user of the PDA 24, the PDA 24 displays a series of screens in a similar way to a conventional ATM display. A typical screen is shown in FIG. 4, which shows various cash withdrawal options. The sequence of screens and the content of each screen may be customized by the user. As the user carries his/her own graphical user interface, no graphical user interface is required on ATM 14a.

Figure 5:
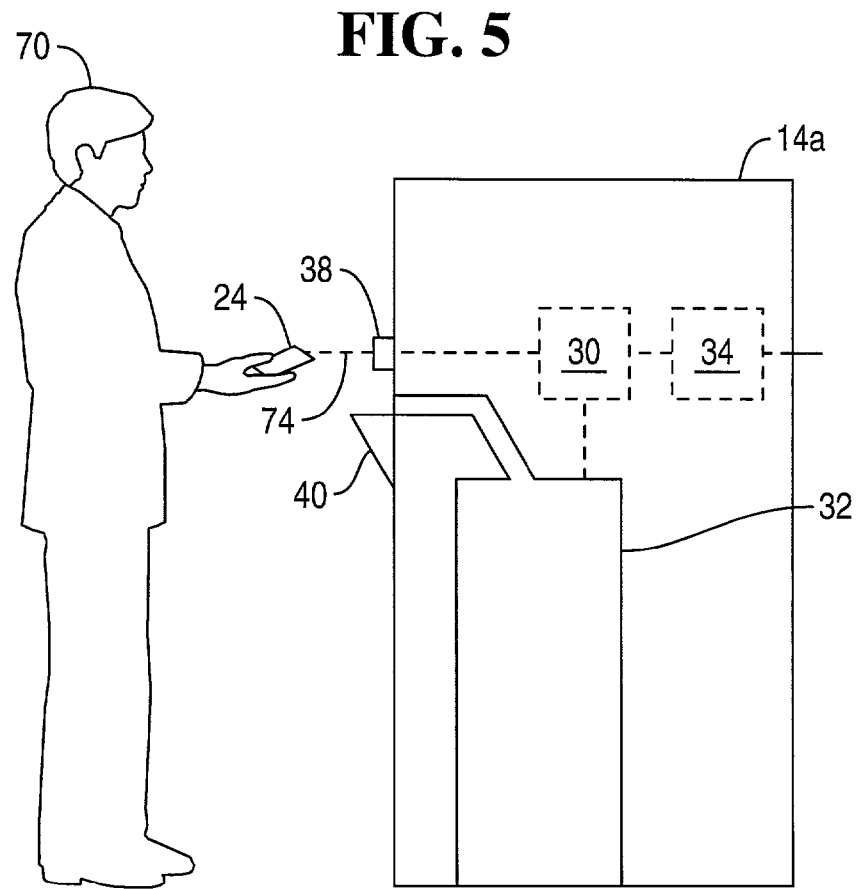
FIG. 5 is a schematic diagram illustrating a user operating the portable device of FIG. 4 in the vicinity of a terminal of FIG. 1.

Referring now to FIG. 5, when a user 70 wishes to withdraw cash from ATM 14a, the user 70 approaches the ATM 14a, executes the transaction program 68 (FIG. 3) on his/her PDA 24, and prepares a transaction. The user 70 prepares a transaction by entering his/her PIN using display 58 (FIG. 3) and selecting a button 72 (FIG. 4) representing an amount to be withdrawn, such as twenty pounds. The controller 52 encrypts the prepared transaction using the encryption facility in the transaction program 68.

The user 70 then aligns the IR port 62 (FIG. 3) with the communications port 38 in the user interface 36 of the ATM 14. The user transmits the encrypted prepared transaction to the ATM 14 using the IR port 62 and communications port 38, as illustrated by broken line 74.

On receiving the encrypted prepared transaction, the IrDA port 38 conveys the transmission to the processor 30. The processor 30 decrypts the received transaction and sends the received PIN and transaction request to the host 12 (FIG. 1) for authorization. The processor 30 then conveys a message to the PDA 24 informing the user 70 that the request is being authorized. On receipt of authorization from the host 12, the processor 30 instructs the cash dispenser 32 to dispense the requested cash (twenty pounds). The dispenser 32 dispenses the cash to the dispense tray 40, and the processor 30 transmits a message to the PDA 24 indicating that the user's cash has been dispensed. The user 70 then removes the dispensed cash to complete the transaction.

If the transaction is not authorized or if the cash cannot be dispensed, then the processor 30 transmits a message to the PDA 24 to inform the user 70 that the transaction cannot be executed. This provides the user 70 with feedback relating to the status and progress of the transaction being executed.

Instead of using PDA 24, the user 70 may use cellular phone 26, as illustrated in FIG. 6. Cell phone 26 has a body 82 housing a keypad 84, a graphics display 86, an antenna 88, and an IrDA port 90. The cell phone 26 also includes a microbrowser (not shown) for receiving Web pages in WML (wireless markup language) format.

To withdraw cash from an ATM 14 using cell phone 26, the user 70 approaches the ATM 14 and executes a cell phone transaction program (not shown). This transaction program may be resident on the phone 26 or may be downloaded from a Web site using the phone's microbrowser. In a similar way to transaction program 68 (FIG. 3), the cell phone transaction program provides the user 70 with a user interface for preparing a transaction, and also provides an encryption facility for encrypting the transaction.

The user 70 prepares a transaction using this cell phone program and executes the transaction by aligning the IrDA port 90 with the ATM's port 38 (FIG. 1) and transmitting the prepared transaction.

Figure 7:
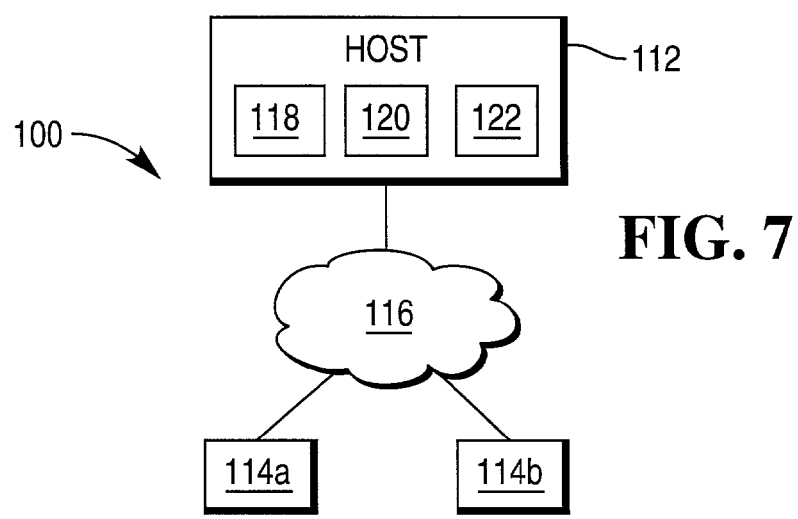
FIG. 7 is a block diagram of a self-service terminal system in accordance with another embodiment of the invention.

Referring now to FIG. 7, which is a block diagram of a self-service terminal system 100 in accordance with another embodiment of the invention, the system 100 includes a host 112 interconnected to a plurality of SSTs 114 (only two are shown) by a network 116. The SSTs 114 are ATMs. The host 112 includes an authorization facility 118, a back-office facility 120, and a plurality of transceivers 122 (only one of which is shown) arranged to be in electrical communication with the host 112. Each transceiver 122 is associated with an ATM 114 and is operable to transmit and receive signals to and from a cellular network and/or a landline connection.

Each transceiver 122 also includes a text to speech processor, a speech to text processor, and an encryption/decryption facility (which may implement the RSA public key encryption, or the data encryption standard) so that information conveyed to and from the transceiver 122 can be encrypted for security purposes.

Figure 8:
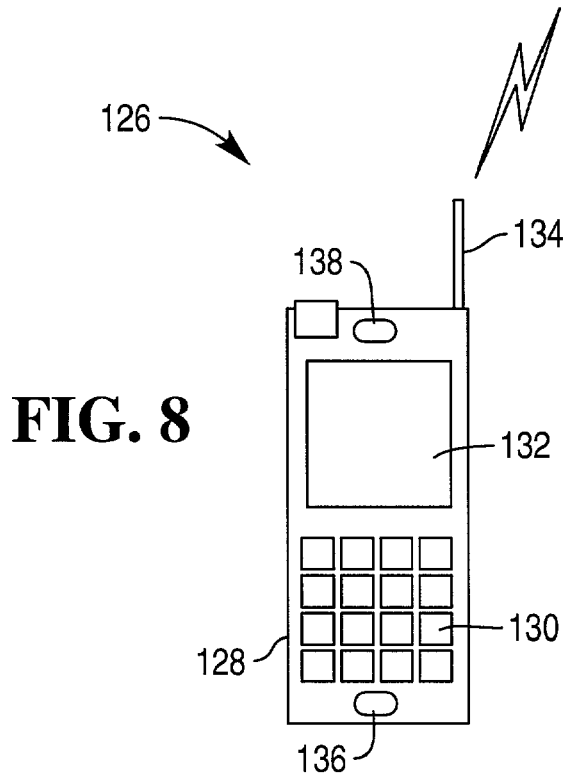
FIG. 8 is a pictorial front view of a portable communication device for use with the system of FIG. 7.

An authorized user can use a wireless communication device 126, such as a GSM cellular telephone as shown in FIG. 8, to access the system 100. The user may be issued with a password for identification purposes, or the transceiver 122 may use the telephone number of the user to identify the user.

In this embodiment, the communication device 126 is a standard GSM cellular telephone (such as a NOKIA (trade mark) 7110 telephone) having a microbrowser for accessing Web pages using a WAP protocol stack. The phone 126 may use WTLS (wireless transport layer security) to provide a secure link for transferring highly confidential data, such as a user's PIN, over a WAP (wireless application protocol) connection. Alternatively, cell phone 126 may include a dedicated encryption/decryption facility (not shown) for increasing the security of any transmission.

Cell phone 126 has a body 128 housing a keypad 130 for entering numbers and/or letters, a graphics display 132 for displaying graphical information, an antenna 134, a microphone 136, and a loudspeaker 138. The cell phone 126 also includes a microbrowser (not shown) for receiving Web pages in WML format.

To withdraw cash from an ATM 114, an authorized user dials the transceiver 122. The telephone number of the transceiver 122 is typically printed on the front of the ATM 114. The transceiver 122 answers the call from the user and prompts the user to enter his/her password using a speech and/or text-based prompt. The text-based prompt is displayed on display 132 and the speech-based prompt is transmitted to the cell phone's loudspeaker 138.

Once a customer has entered his/her password (using keypad 130 or microphone 136), the telephone 126 encrypts and conveys it to the transceiver 122. Transceiver 122 performs any speech to text conversion required, decrypts the received password, and then sends an encrypted prompt to the customer's telephone 126, which, when decrypted, requests the customer to enter his/her PIN. The entered PIN is then encrypted and conveyed, and the transceiver 122 then requests the user to enter the amount of cash to be withdrawn. Once the transceiver 122 has received the desired amount, the transceiver 122 conveys the user's password, PIN and the desired amount to the authorization facility 118 for authorization. On receipt of authorization, the transceiver 122 conveys a message to the user's cell phone 126 advising the user that his/her cash is about to be dispensed. The transceiver 122 also sends a message to the ATM 114 via network 116 instructing the ATM 114 to dispense the authorized amount.

Prior to authorizing the transaction, the transceiver 122 may advise the user (via cell phone 126) of a transaction charge that will be levied for the transaction, and may request the user to confirm that he/she still wishes to execute the transaction. If within a pre-set time, such as twenty seconds, the user does not confirm that he/she wishes the transaction to be executed then the transaction may be cancelled. If the user does confirm that he/she wishes to proceed with the transaction, then the transceiver 122 applies a charge to an account held by the user. This may be a telecommunications account for the cellular telephone, or it may be a bank account. For each transaction, the transceiver 122 may credit a user's telecommunications account with free time, for example, one minute for each pound that has been withdrawn.

It will be appreciated that in this embodiment the ATMs 114 have a user interface consisting of a dispense area; whereas, in the FIG. 1 embodiment, the ATMs 14 have a user interface consisting of a dispense are and a communication port.

In another embodiment, a communication device having an integral identifier (such as a biometrics sensor in the form of a fingerprint sensor) may be used. In such an embodiment, the device may provide a special signal when the user of the device has been identified. This special signal may be used by a transceiver as confirmation of the user's identity, thereby avoiding the need for the user to enter a PIN.

Figure 9:
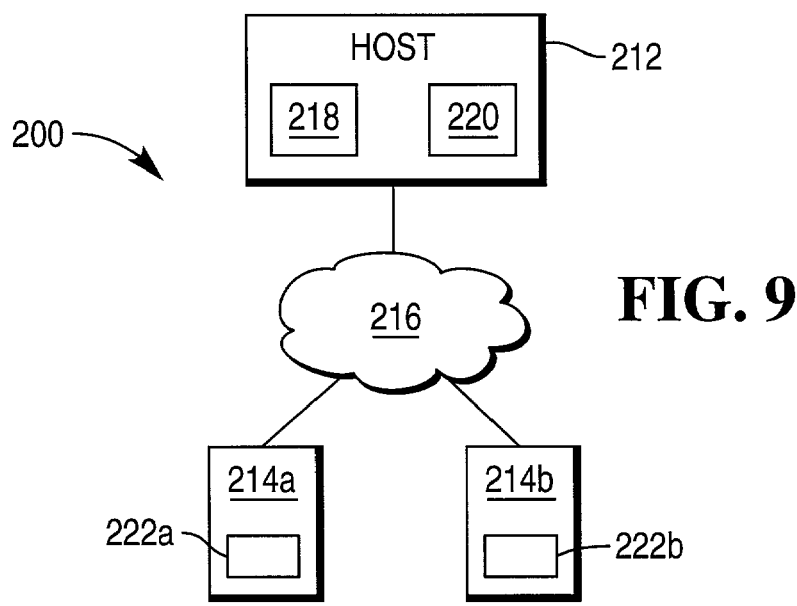
FIG. 9 is a block diagram of a self-service terminal system in accordance with yet another embodiment of the invention.

Referring now to FIG. 9, which shows a system according to another embodiment of the present invention, the system 200 comprises a host 212 interconnected to a plurality of SSTs 214 (only two are shown) by a network 216. The SSTs 214 are ATMs. The host 212 includes an authorization facility 218 and a back-office facility 220. Each ATM 214 includes a transceiver 222.

In use, an authorized customer uses a cellular telephone 126 (which is identical to that described with reference to FIGS. 7 and 8) to dial the telephone number of one of the transceivers 222a (each transceiver 222 has a different predetermined telephone number). The transceiver 222a operates in substantially the same way as described for the FIG. 7 embodiment, however, to obtain authorization for a transaction, the transceiver 222a transmits information across network 216 to the host 212, and receives authorization from the host 212 via network 216.

It will be appreciated that the above embodiments all have the advantage that an ATM is provided that requires a very simple and inexpensive user interface. This greatly reduces the cost of the ATM, as the user interface is generally very expensive. It also reduces the complexity of the ATM, which reduces the maintenance and increases the reliability of the ATM.

Various modifications may be made to the above described embodiment within the scope of the invention, for example, any convenient wireless communication device may be used, such as a dedicated internet access device. In other embodiments, an ATM may include a card reader. In other embodiments, a wireless communication device may include a Smart card reader for receiving a Smart card, where the Smart card may be used to identify the user of the device. In other embodiments, a communications device may use Bluetooth (trade mark) technology to communicate with an ATM. In other embodiments, the media dispensed may include stamps, telephone cards, ski passes, or such like. In other embodiments, the transceivers 122 may be implemented by a call center. In other embodiments, the cell phone may include a PIN for authorizing withdrawals, where the PIN is stored in the SIM (subscriber identity module), and may be accessed only when the user enters a code. In other embodiments, an ATM may include a user interface additionally comprising an encrypting keypad and a display, and the ATM may be operable in two modes, so that in a first mode a user may enter information using the keypad; and in a second mode a user may enter information using a wireless communication device such as a cellular telephone.

What is claimed is:

1. An automated teller machine (ATM) for enabling an ATM customer to conduct a cash withdrawal transaction, the ATM comprising:
    a network connection connectable through a network to a host which is operable to authorize the cash withdrawal transaction; and
    a user interface consisting essentially of (i) a communication port which is operable to transmit transaction information to a portable communication device of the ATM customer to provide the ATM customer with feedback about the cash withdrawal transaction, and (ii) a dispense area in which cash can be dispensed during the cash withdrawal transaction, wherein the user interface provides no keypad to the ATM customer and provides no video display to the ATM customer.

2. An ATM according to claim 1, further comprising means for enabling the ATM to be operable in a first mode in which the ATM customer can enter information using the user interface located on the ATM, and in a second mode in which the ATM customer can enter information using a portable user interface located on the portable communication device.

3. A method of operating an automated teller machine (ATM) having a user interface which has no keypad and no video display and which user interface consists essentially of a communication port and a dispense area, the method comprising:
    connecting the ATM through a network to a host which is operable to authorize a cash withdrawal transaction;
    transmitting transaction information to a portable communication device of an ATM customer via the communication port to provide the ATM customer with feedback about the cash withdrawal transaction; and
    dispensing cash to the dispense area during the cash withdrawal transaction.

* * * * *